United States Patent [19]
Bishop

[11] 3,877,259
[45] Apr. 15, 1975

[54] SHAFT COUPLER
[75] Inventor: Bernard Frank Bishop, Chicago, Ill.
[73] Assignee: Illinois Tool Works Inc., Chicago, Ill.
[22] Filed: Mar. 27, 1973
[21] Appl. No.: 345,299

[52] U.S. Cl. ................. 64/29; 64/27 NM; 64/30 E; 74/640; 192/74
[51] Int. Cl. .............................................. F16d 3/56
[58] Field of Search .......... 64/29, 30 E, 30 D, 30 R, 64/27 NM, 27 B; 74/640; 192/74, 55, 44

[56] References Cited
UNITED STATES PATENTS

| | | | |
|---|---|---|---|
| 2,103,781 | 12/1937 | Hansom | 64/30 |
| 2,461,447 | 2/1949 | Siesel | 64/29 |
| 2,668,426 | 2/1954 | Hoover | 64/29 |
| 2,956,656 | 10/1960 | Becksted | 192/74 |
| 3,204,430 | 9/1965 | Sniel | 64/30 |
| 3,296,888 | 1/1967 | Schweitzer | 64/29 |

Primary Examiner—Samuel Scott
Assistant Examiner—Randall Heald
Attorney, Agent, or Firm—Olson, Trexler, Wolters, Bushnell & Fosse, Ltd.

[57] ABSTRACT

The present invention relates generally to improvements in shaft coupler devices and more particularly to improved coupler devices in the nature of torque limiting clutch mechanisms. An embodiment of the present invention disclosed herein includes a plurality of yieldable beam members adapted to be supported by and to rotate with a driven shaft, the inner surfaces of said yieldable beam members being uniformly oriented circumferentially about and spaced from the axis of an associated supporting shaft so as to define a non-circular opening for accommodating a plurality of rotary coupling members as for example a plurality of rollers. These rollers revolve as a unit with and about the axis of a driving shaft and are maintained in engagement with the inner surface area of the yieldable beam members.

5 Claims, 7 Drawing Figures

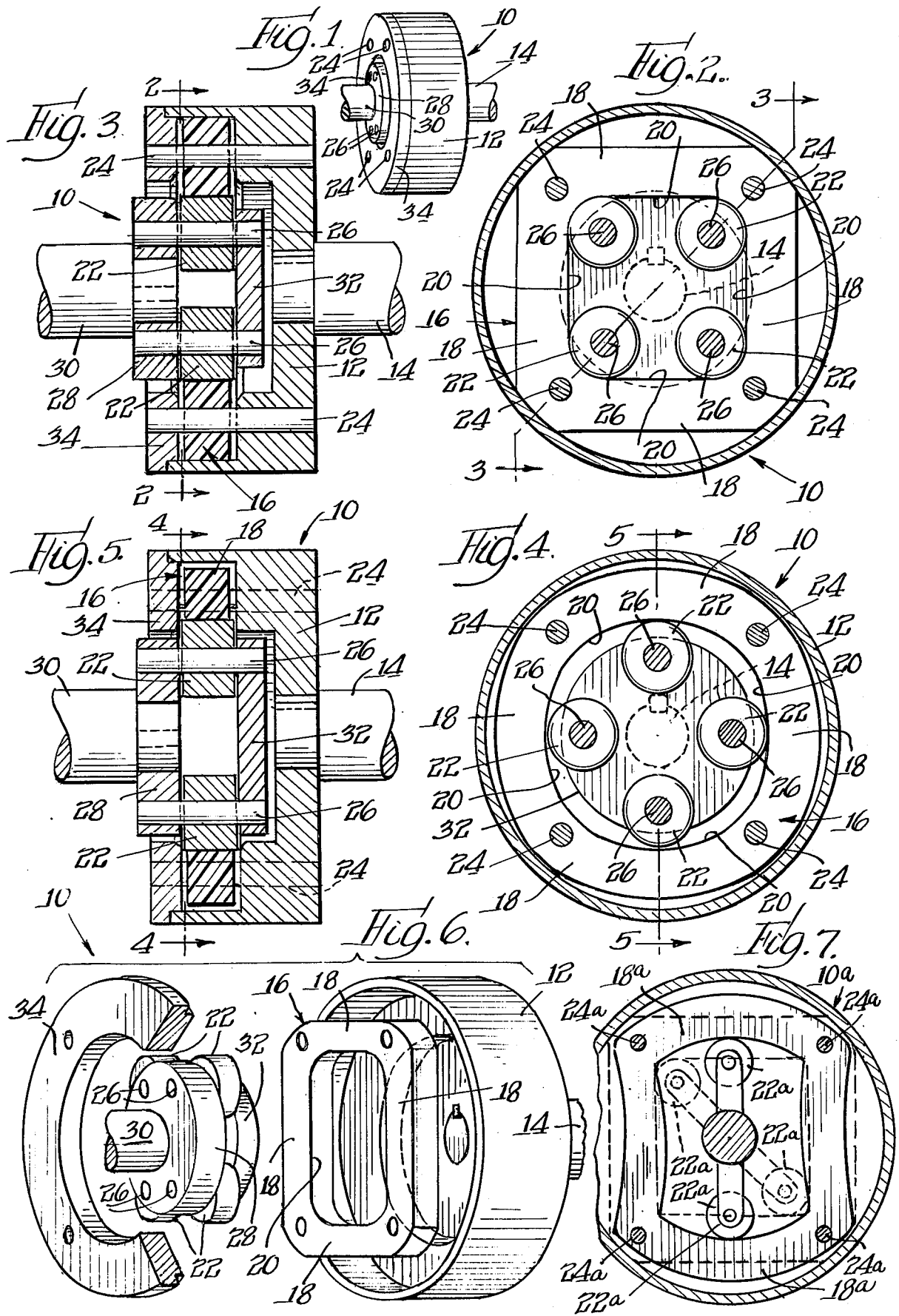

SHAFT COUPLER

The invention herein described was made in the course of or under a contract or subcontract thereunder with the Department of the Navy of the United States Government.

SUMMARY OF THE INVENTION

Various types of clutch and shaft coupling designs of the friction, spring detent magnetic and fluid types have heretofore been available and the present invention makes possible the provision of a clutch or shaft coupling arrangement which overcomes functional or operational deficiencies of these prior mechanisms.

The present invention contemplates the provision of a novel and very practical shaft coupling device which is quiet in operation and which will serve as a torque limiting clutch operable with equal facility both in and out of water.

More specifically, it is an object of the present invention to provide a clutch or shaft coupling mechanism which is compact in design, quiet-running, self-resetting, and incorporates a novel overrunning slip clutch feature for automatically limiting or controlling the extent to which rotative forces are imparted from a drive to a driven shaft.

It is a further object of the present invention to provide a coupling mechanism of the type referred to above which incorporates a novel and very practical arrangement of yieldable beam members which will bend intermediate the extremities thereof when torque or load resistance reaches a predetermined level.

Still more specifically, the present invention contemplates a clutch or shaft coupling device of the type set forth above wherein a plurality of deflectable beam members are employed in operative association with the plurality of circumferentially disposed rotary coupling elements, such as rollers, positioned within an opening defined by the inner surfaces of said beam members.

BRIEF DESCRIPTION OF THE DRAWINGS

The foregoing and other objects and advantages will be more apparent from the following detailed description when considered in connection with the accompanying drawing wherein:

FIG. 1 is a perspective view of a compact clutch or coupling mechanism of the type contemplated by the present invention;

FIG. 2 is an enlarged transverse sectional view taken substantially along the line 2—2 of FIG. 3;

FIG. 3 is a central longitudinal sectional view taken substantially along the line 3—3 of FIG. 2;

FIG. 4 is a transverse sectional view taken substantially along the line 4—4 of FIG. 5 after the rollers have been revolved about the common axes of the drive and driven shafts through substantially 45° from the position illustrated in FIG. 2;

FIG. 5 is a longitudinal sectional view taken substantially along the line 5—5 of FIG. 4;

FIG. 6 is an exploded fragmentary perspective view illustrating the constituent elements of the coupling mechanism shown in FIGS. 1 to 5 inclusive; and FIG. 7 is a fragmentary transverse sectional view similar to FIG. 4 illustrating a modified clutch or coupling mechanism wherein only two diametrically disposed drive rollers are employed as distinguished from the four circumferentially spaced drive rollers illustrated in FIGS. 2 and 4.

DESCRIPTION OF PREFERRED EMBODIMENTS OF THE INVENTION

Referring now to the drawing more in detail wherein like numerals have been employed to designate similar parts in the various figures, it will be seen that one embodiment of a shaft coupler or clutch mechanism is designated generally by the numeral 10 in FIGS. 1 to 6 inclusive. The coupling mechanism 10 includes a rotary, generally cylindrical mounting member 12 keyed to and rotatable about the axis of a driven shaft member 14.

Housed within and rotatable as a unit with the mounting member 12 is a polygonally shaped or non-circular coupling element designated generally by the numeral 16. The coupling member 16 is formed from suitable resilient or yieldable material and is comprised of four identical beam members 18, the inner surfaces 20 of which are uniformally oriented circumferentially about and spaced from the axis of the driven shaft 14. These inner surfaces 20, in the aggregate define a non-circular or generally polygonal opening for accommodating rotary coupling members or rollers 22 which are circumferentially spaced uniformly about the axis of the shaft 14.

It will be noted that the outer corner peripheries of the coupling member 16 bear against the inner periphery of the generally cylindrical member 12 and that four longitudinally disposed pins 24 serve to couple the member 16 to rotate as a unit with the member 12. Likewise, each of the rollers 22 are rotatably supported by longitudinally extending complementary pins 26. When the rollers 22 occupy the position with respect to the member 16 as viewed in FIG. 2 each of said rollers will engage a complementary inner curved corner surface located in the vicinity of intersecting extremities of each pair of the beam members 18.

It will be noted that the left extremities of the pins 26 as viewed in FIGS. 3 and 5 are mounted in a collar or disc member 28 which is keyed to the extremity of a drive shaft 30. The opposite extremities of the pins 26 projecting from the opposite sides of the rollers 22 are mounted within a disc or plate member 32. It will thus be apparent that the rollers 22 are adapted to move as a unit with the drive shaft 30 and revolve about the axis of said drive shaft as well as the coincident axis of the driven shaft 14. The left extremities of the pins 24 as viewed in FIGS. 3 and 5 extend within complementary apertures provided in a closure member or cover plate 34. From the foregoing, it will be understood that when the rollers 22 occupy the corner positions of the inner surfaces 20 of the yieldable coupling member 16, rotation of the drive shaft 30 will cause rotation of the generally cylindrical mounting member 12 and the driven shaft 14. In order for the rollers 22 to impart rotation to the yieldable coupling member 16 and consequently to the driven shaft 14, it must be assumed that the torque load does not exceed a predetermined level. Obviously, if the torque required to cause rotation of the shaft 14 exceeds a predetermined or established level, the rollers 22 will shift within the member 16 as illustrated by the position of the rollers in FIG. 4. When thus shifted, the rollers 22 will cause the intermediate portions of each beam 18 to be outwardly deflected thereby limiting the driving effectiveness of the rollers.

If the force required to rotate the driven shaft 14 falls to the predetermined level referred to above, the rollers 22 will automatically reset and occupy their normal driving positions illustrated in FIG. 2. Operating under the above-mentioned conditions, the coupling mechanism 10 functions as a torque limiting clutch device. It will also be seen that shaft 14 may be driven in either direction of rotation without any structural alteration of the shaft coupling mechanism.

In FIG. 7 a slightly modified form of coupling mechanism is designated generally by the numeral 10a. Constituent parts of the mechanism 10a corresponding with similar parts of the mechanism 10 are identified by like numerals bearing the suffix (a). The only significant structural difference between the previously described mechanism 10 and the mechanism 10a is in the provision of two diametrically disposed rotary coupling members or rollers 22a as distinguished from the previously described four rollers 22. In FIG. 7 in solid line position of the rollers 22a illustrate the manner in which said rollers cause deflection of the intermediate portions of diametrically opposite beam members 18a corresponding with beam deflection shown in FIG. 4. The dotted position of the rollers 22a disclose said rollers in association with diametrically opposite corner portions of the inner surface 20a, corresponding with the positions of the four rollers 22 as illustrated in FIG. 2.

From the foregoing, it will be apparent that the present invention contemplates a shaft coupling device or clutch which is not only quiet in operation but also relatively simple structurally yet sturdy. The constituent parts are relatively few in number and the device may be produced economically. The static average running and reset torques are approximately equal and the mechanism will operate bidirectionally. If it is desired to have the slipping torque level different in opposite directions of rotation, this may be accomplished by varying the angle of incidence between the rollers and the complementary inner beam surfaces engaged thereby. The mechanism contemplated hereby is such that misalignment of the shafts within given limits will not affect operational efficiency. Variation in clutch capacities may be accomplished by simply replacing one set of yieldable beam members with another set having different levels of flexibility. As previously set forth, the above-described coupling mechanism will operate with the same degree of efficiency in or out of water and it has been found that reasonable environmental conditions do not affect torque capacity. The present invention also contemplates the use of spherical roller members which will function similarly to the above-described roller members. Thus, the term rollers as used herein contemplates sherical members as well as rollers of the type illustrated.

It should be noted that reductions to practice of the invention have established its unusual reliability and long operational life over known prior art torque limiting devices. It appears that the unexpected reliability of the invention is due to certain details of the arrangement of elements which are not readily apparent upon a cursory consideration of the invention. Those details are that the coupling element 16 should be an elastomeric material such as rubber, that the beam members 18 of the element 16 be pinned or substantially anchored at each end, that the beam members 18 be arranged to permit relatively high deflection at the longitudinal center relative to the anchored ends, and that rollers 22 or their equivalents firmly engage the beam members 18 at the anchored ends thereof. The resulting combination produces three types of forces which uniquely cooperate to render the coupling mechanism 10 unexpectedly reliable. The first force is a compression force that occurs as the rollers 22 first begin to leave the anchored ends of the beam members 18 when the torque transmitted through the device approaches the designed torque. The second force occurs as the rollers 22 are moved away from the anchored ends of the beam members 18 and causes a radially outwardly directed bending force on the beam members 18. The third force is a stretching or tension force and is produced when the rollers 22 cause the beam members 18 to be increased in length or stretched between their anchored ends. Those three forces cooperate to provide an accurate and reliable designed maximum torque transfer between the driving and driven shafts. When the maximum torque rating of the mechanism is reached, those three forces encounter three corresponding reaction forces which accurately and reliably limit the output torque to the designed maximum as the rollers 22 orbit in the element 16. That described force action and reaction results in a torque limiting mechanism 10 which in use is subject to a minimum of wear and consequent long operational life.

details have been disclosed herein, it should be understood that the present invention contemplates other modifications and changes without departing from the spirit and scope of the appended claims.

The invention is claimed as follows:

1. A coupler device for coupling a drive shaft and a driven shaft, means providing a structure presenting a plurality of yieldable beam members adapted to be supported by and rotatable with one of said shafts, the extremities of said beam members being secured on said one of said shafts against any movement along the respective longitudinal axes of said beam members, the inner surfaces of said beam members being uniformly oriented circumferentially about and spaced from the axis of said supporting shaft so as to define a non-circular opening of straight surfaces extending between corner areas for accommodating a plurality of rotary coupling members, a plurality of circumferentially spaced rotary coupling members positioned within said opening, and mounting means rotatable as a unit with said other shaft for positioning each of said rotary coupling members in engagement with the inner surface areas of two adjacent beam members in said corner areas of said yieldable beam members whereby to provide a flexible coupling between said shafts.

2. A coupler device for coupling a drive shaft and a driven shaft as set forth in claim 1, wherein the corner areas of said inner surfaces of said beam members have a curvature corresponding generally with the curvature of the peripheral surfaces of said rotary coupling members.

3. A coupler device for coupling a drive shaft and a driven shaft as set forth in claim 1, wherein portions of the yieldable beam members in the vicinity of adjacent extremities thereof are secured against radial displacement and displacement in directions longitudinally of said beam members and the intermediate portions of said beam member are laterally deflectable.

4. A coupler device for coupling a drive shaft and a driven shaft as set forth in claim 1, wherein the rotary coupling members are in the form of rollers, and means is provided for rotatably supporting said members.

5. A coupler device for coupling a drive shaft and a driven shaft, comprising a plurality of beam members carried on one of said shafts, said beam members being integrally formed from an elastomeric material in a closed generally polygonal loop, at least one coupling member carried on the other of said shafts to rotate therewith and positioned in engagement with the inner surface corner areas of two adjacent beam members whereby to provide a flexible coupling between said shafts, the radially outward periphery of said coupling member tracing a circle of a certain diameter during rotation of said other shaft, means for substantially anchoring the ends of said beam members in the plane of said circle and as chords to said circle with the radially outward sides of said beam members intermediate the ends thereof being unconfined, said means further anchoring the ends of said beam members to position the inner peripheral junctions of adjoining beam members substantially on said circle and with the ends of said beam members anchored against any movement along the longitudinal axes of said beam members, whereby any relative rotation between said shafts produces a compression, a bending and a stretching of any of said beam members engaged by said coupling member.

* * * * *